US011884061B2

(12) United States Patent
Awanohara

(10) Patent No.: US 11,884,061 B2
(45) Date of Patent: Jan. 30, 2024

(54) PRINTING APPARATUS

(71) Applicant: Seiko Epson Corporation, Tokyo (JP)

(72) Inventor: Yuki Awanohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/653,065

(22) Filed: Mar. 1, 2022

(65) Prior Publication Data

US 2022/0281242 A1 Sep. 8, 2022

(30) Foreign Application Priority Data

Mar. 2, 2021 (JP) ................................ 2021-032550

(51) Int. Cl.
*B41J 11/06* (2006.01)
*B41J 11/00* (2006.01)

(52) U.S. Cl.
CPC ............ *B41J 11/06* (2013.01); *B41J 11/0085* (2013.01)

(58) Field of Classification Search
None
See application file for complete search history.

(56) References Cited

FOREIGN PATENT DOCUMENTS

JP 2009-113350 5/2009

OTHER PUBLICATIONS

Maekawa, Printer, Nov. 11, 2010, Japan, All Pages (Year: 2010).*
Setoriyama, Image Forming Device, Apr. 4, 2001, Europe, All Pages (Year: 2001).*
Kashima, Koji, Washer-dryer, Aug. 15, 2007, China, All Pages (Year: 2007).*

* cited by examiner

*Primary Examiner* — Justin Seo
*Assistant Examiner* — Tracey M McMillion
(74) *Attorney, Agent, or Firm* — WORKMAN NYDEGGER

(57) ABSTRACT

Provided is a printer including: a platen having a plurality of suction ports for sucking a recording medium, a suction fan, a suction duct configured to couple the plurality of suction ports and the suction fan to each other, and a motor, wherein the suction duct includes a cover member covering a portion of the motor, a gap is formed between the cover member and the motor, and an opening is formed in the cover member.

4 Claims, 2 Drawing Sheets

PRINTING APPARATUS

The present application is based on, and claims priority from JP Application Serial Number 2021-032550, filed Mar. 2, 2021, the disclosure of which is hereby incorporated by reference herein in its entirety.

BACKGROUND

1. Technical Field

The present disclosure relates to a printing apparatus.

2. Related Art

JP-A-2009-113350 discloses a printer having a configuration in which a motor is cooled using an air flow suctioned from a platen.

However, in the configuration disclosed in JP-A-2009-113350, suction ports of the platen are covered by a recording medium and hence, the airflow flowing through a flow path is not large. Further, the motor is cooled indirectly by way of an outer case and hence, the cooling efficiency is reduced.

SUMMARY

According to an aspect of the present disclosure, there is provided a printing apparatus including a platen having a plurality of suction ports for sucking a printing medium, a suction fan, a suction duct configured to couple the plurality of suction ports and the suction fan to each other, and a component having a heat generating source, wherein the suction duct has a cover member covering at least a portion of the component, a gap is formed between the cover member and the component, and an opening is formed in the cover member.

DESCRIPTION OF EXEMPLARY EMBODIMENTS

Hereinafter, an embodiment of the present disclosure is described with reference to drawings.

Figure 1:
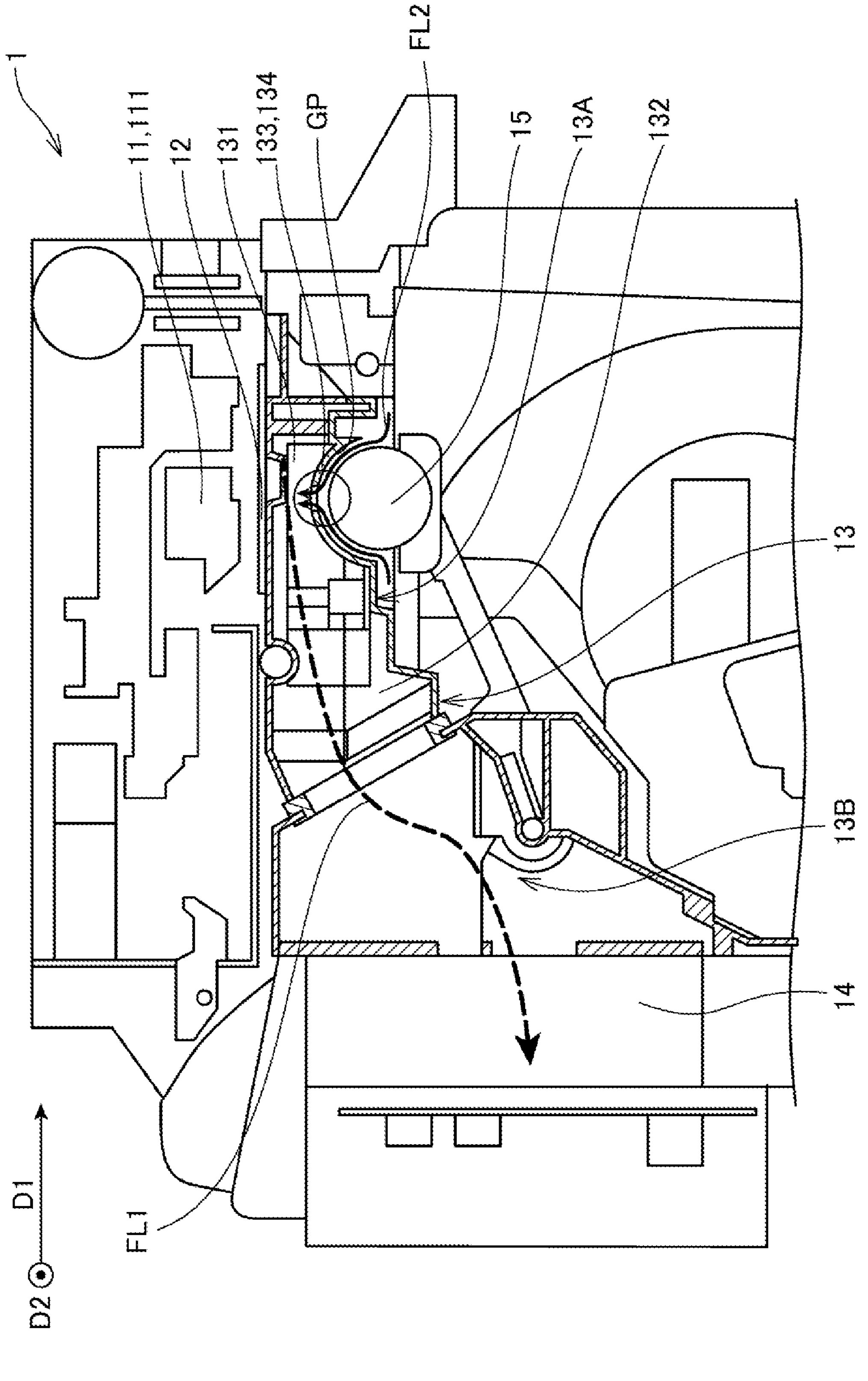
FIG. 1 is a cross-sectional side view illustrating an example of a configuration of a printer according to the present embodiment.

FIG. 1 is a cross-sectional side view illustrating an example of a configuration of a printer 1 according to the present embodiment.

The printer 1 is an ink jet-type printer configured to form an image on a printing surface of a recording medium by ejecting ink to the recording medium.

The printer 1 corresponds to an example of a "printing apparatus".

The printer 1 includes a recording head 111 configured to eject ink to the recording medium. The printer 1 is configured to perform color printing by ejecting plural colors of inks from the recording head 111. For example, the recording head 111 is configured to eject five colors of inks, that is, yellow, magenta, cyan, black, and white inks, from different nozzles respectively. The number of colors of the inks that the printer 1 uses is not particularly limited.

The recording head 111 is mounted on a carriage 11 so as to face the recording medium. The carriage 11 causes the recording head 111 to scan in a direction intersecting with a transport direction D1 (a lateral direction in FIG. 1) of the recording medium, that is, in a width direction D2 of the recording medium.

A platen 12 is disposed at a position facing the recording head 111. The platen 12 supports the recording medium at a position facing the recording head 111 on a support surface formed in a planar shape.

Figure 2:
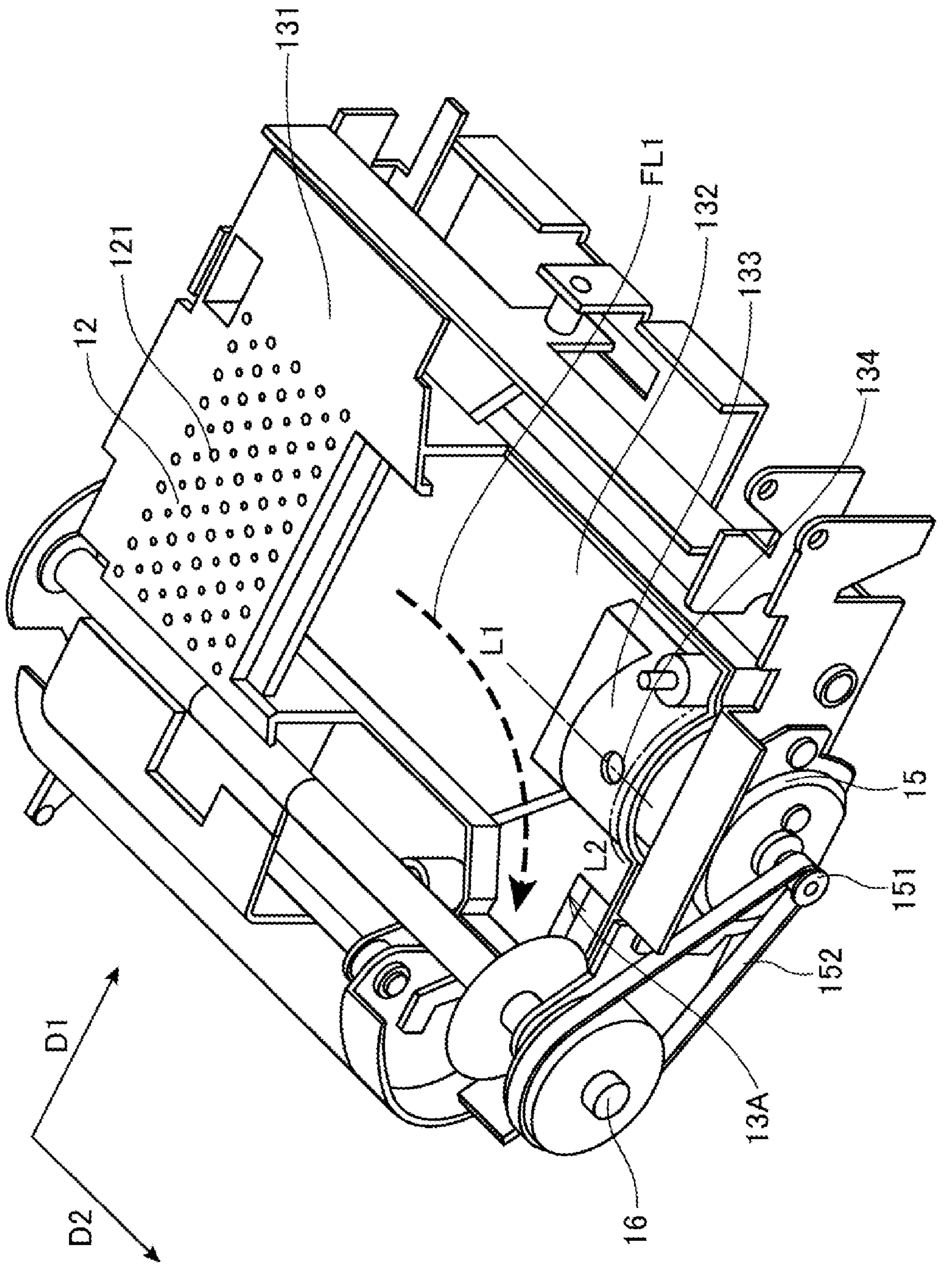
FIG. 2 is a perspective view illustrating an example of a configuration of an upstream-side duct.

As illustrated in FIG. 2, the platen 12 includes a plurality of suction ports 121 configured to suck the recording medium. Each of the plurality of suction ports 121 is inserted into a suction duct 13 held at a negative pressure. Accordingly, outside air flows in toward the suction duct 13 through each of the plurality of suction ports 121. As a result, the recording medium disposed on the platen 12 is suctioned to the support surface by the plurality of suction ports 121.

Provided that the recording medium has a sheet shape, a material of the recording medium is not particularly limited. Accordingly, paper, a sheet made of a synthetic resin, or the like can be used as the recording medium. The recording medium is a cut sheet cut into a regular size. The recording medium is stored in a paper feeding cassette not illustrated in the drawing, for example.

The recording medium stored in the paper feeding cassette is transported to the platen 12 by a transport unit. Then, on the platen 12, printing is performed on the recording medium by the recording head 111. Thereafter, the recording medium is transported toward a discharge tray and is stacked on the discharge tray.

The suction duct 13 is configured to couple the plurality of suction ports 121 and a suction fan 14 to each other. A pressure in the suction duct 13 is held at a negative pressure by the suction fan 14. Air in the suction duct 13 flows from below the platen 12 toward the suction fan 14, as indicated by a direction FL1.

The suction duct 13 is constituted of an upstream side duct 13A and a downstream side duct 13B. The upstream side duct 13A is disposed below the platen 12, and extends in the width direction D2 of the recording medium as described with reference to FIG. 2.

The downstream side duct 13B is formed at a position facing the suction fan 14. The downstream side duct 13B extends in a vertical direction from a coupling portion with the upstream side duct 13A toward the suction fan 14. A size of the downstream side duct 13B in the vertical direction at the position facing the suction fan 14 is substantially equal to a size in the vertical direction of the suction fan 14.

The suction fan 14 is disposed at an end portion of the suction duct 13 in a direction opposite to the transport direction D1, and is configured to discharge air in the suction duct 13 to the outside. The suction fan 14 generates a negative pressure in the suction duct 13.

The upstream side duct 13A includes a first member 131 supporting the platen 12, and a second member 132 facing the first member 131. The first member 131 constitutes a portion of an upper surface of the upstream side duct 13A and a portion of a side surface of the upstream side duct 13A. The second member 132 constitutes a lower surface of the upstream side duct 13A and a portion of the side surface of the upstream side duct 13A.

The second member 132 includes a cover member 133. The cover member 133 is disposed on an end portion of the second member 132 on one side in the width direction D2 (a viewer's side in FIG. 1). Further, the cover member 133 is disposed at a position facing the platen 12. Further, the cover member 133 is disposed on the second member 132 and constitutes a portion of the lower surface of the upstream side duct 13A.

The cover member 133 covers a portion of the motor 15. As illustrated in FIG. 1, the cover member 133 is formed in a semicircular cylindrical shape extending along an upper surface of the motor 15.

The motor 15 corresponds to an example of a "component having a heat generating source". As described with reference to FIG. 2, the motor 15 is configured to drive a transport roller 16. The transport roller 16 is configured to transport the recording medium toward the platen 12. The motor 15 is a stepping motor, for example.

The motor 15 is heated because the motor 15 repeats transporting and stopping of the recording medium frequently. Particularly, in order to increase an image quality of an image formed on the recording medium, the number of transporting and the number of stopping of the recording medium are increased. Further, in order to increase a transport speed of the recording medium, a current flowing in the motor 15 is increased. Accordingly, along with the increase of the image quality of an image and the increase of a transport speed of the recording medium, a heat generation amount of the motor 15 is increased.

A gap GP is formed between the cover member 133 and the motor 15. As illustrated in FIG. 1 and FIG. 2, the motor 15 is formed in a circular columnar shape. The cover member 133 is formed in a semicircular cylindrical shape along a shape of an outer surface of the motor 15 such that a size of the gap GP becomes constant.

An opening 134 is formed in the cover member 133. The inside of the upstream side duct 13A is communicated with the outside through the opening 134. Further, a pressure in the suction duct 13 is held at a negative pressure by the suction fan 14. Here, air flows into the upstream side duct 13A through the opening 134.

As illustrated by a direction FL2 in FIG. 1, the outside air flows into the opening 134 along the gap GP, and the outside air flows into the upstream side duct 13A from the opening 134.

In this way, the outside air flows into the opening 134 along the gap GP and hence, the motor 15 is effectively cooled.

FIG. 2 is a perspective view illustrating an example of a configuration of the upstream side duct 13A.

Here, in FIG. 2, a portion of the platen 12 and a portion of the first member 131 are cut out in order to facilitate visual recognition of the cover member 133 and the opening 134.

As illustrated in FIG. 2, in the upstream side duct 13A, air flows as illustrated by the direction FL1. That is, air flows into the inside of the upstream side duct 13A from the outside through the plurality of suction ports 121 formed in the platen 12. Then, air flows through the inside of the upstream side duct 13A in a positive direction of the width direction D2. Further, on a positive direction side in the width direction D2 of the upstream duct 13A, air in the upstream side duct 13A flows in a negative direction of the transport direction D1, that is, toward the downstream side duct 13B.

As illustrated in FIG. 2, the upstream side duct 13A is formed in a rectangular box shape extending in the transport direction D1 and the width direction D2. In the second member 132 of the upstream side duct 13A, the cover member 133 is disposed at an end position in the positive direction in the width direction D2. The cover member 133 is formed in an upwardly protruding semicircular cylindrical shape.

The opening 134 having a circular shape is formed in the cover member 133 at an upper end position of the cover member 133.

The position of the opening 134 in the cover member 133 is the center position of the cover member 133 in the transport direction D1 of the recording medium, and is the position remoter from the motor 15 than the center position of the cover member 133 in the width direction D2 of the recording medium.

A center position L1 of the cover member 133 in the transport direction D1 of the recording medium is indicated by a dotted chain line, and a center position L2 of the cover member 133 in the width direction D2 of the recording medium is indicated by a dotted chain line.

The position of the opening 134 in the cover member 133 is the center position of the cover member 133 in the transport direction D1 of the recording medium. Accordingly, a distance that outside air flows toward the opening 134 along the gap GP is increased and hence, the motor 15 can be effectively cooled.

Further, the position of the opening 134 in the cover member 133 is the position remoter from the motor 15 than the center position of the cover member 133 in the width direction D2 of the recording medium. Accordingly, a distance that outside air flows toward the opening 134 from the end position of the cover member 133 in the positive direction of the width direction D2 along the gap GP, that is, a distance that outside air flows in the width direction D2 along an outer surface of the motor 15 is increased and hence, the motor 15 can be effectively cooled.

A rotary shaft 151 of the motor 15 extends in the width direction D2 as illustrated in FIG. 2.

The rotary shaft 151 of the motor 15 is coupled to the transport roller 16 by way of a pulley 152. That is, the motor 15 rotates and drives the transport roller 16 by way of the pulley 152.

Further, the opening 134 is formed such that an air pressure in the suction duct 13 becomes equal to or below a predetermined pressure, in a printing region facing the recording head 111.

Specifically, a size and a shape of the opening 134, and the number of openings 134 are set such that an air pressure in the suction duct 13 becomes equal to or below the predetermined pressure, in the printing region facing the recording head 111. The predetermined pressure indicates a pressure required for the recording medium to be sucked to the platen 12. The printing region corresponds to a region where the platen 12 is disposed.

As has been described heretofore with reference to FIG. 1 and FIG. 2, the printer 1 according to the present embodiment includes the platen 12 having the plurality of suction ports 121 for sucking the recording medium, the suction fan 14, the suction duct 13 configured to couple the plurality of suction ports 121 and the suction fan 14 to each other, and the motor 15, wherein the suction duct 13 has the cover member 133 covering a portion of the motor 15, the gap GP is formed between the cover member 133 and the motor 15, and the opening 134 is formed in the cover member 133.

According to such a configuration, a pressure in the suction duct 13 is held at a negative pressure by the suction fan 14, and outside air flows into the opening 134 along the gap GP formed between the cover member 133 and the motor 15. Accordingly, due to the flow of the outside air, the motor 15 can be effectively cooled.

Further, in the printer 1, the cover member 133 is disposed at the position facing the platen 12, the position of the opening 134 in the cover member 133 is the center position of the cover member 133 in the transport direction D1 of the recording medium, and is the position remoter from the motor 15 than the center of the cover member 133 in the width direction D2 of the recording medium.

According to such a configuration, the cover member 133 is disposed at the position facing the platen 12 and hence, at the position where the cover member 133 is disposed, a pressure in the suction duct 13 is held at a negative pressure for causing the recording medium to be sucked to the platen 12.

Further, the position of the opening 134 in the cover member 133 is the center position of the cover member 133 in the transport direction D1 of the recording medium. Accordingly, a distance that outside air flows toward the opening 134 along the gap GP is increased and hence, the motor 15 can be effectively cooled.

Further, the position of the opening 134 in the cover member 133 is the position further separated from the motor 15 than the center position of the cover member 133 in the width direction D2 of the recording medium. Accordingly, a distance that outside air flows toward the opening 134 from the end position of the cover member 133 in the positive direction of the width direction D2 along the gap GP, that is, a distance that outside air flows in the width direction D2 along the outer surface of the motor 15 is increased and hence, the motor 15 can be effectively cooled.

Further, in the printer 1, the suction duct 13 includes the first member 131 supporting the platen 12, and the second member 132 facing the first member 131, and the cover member 133 is formed on the second member 132.

According to such a configuration, the cover member 133 is formed on the second member 132 and hence, the cover member 133 can be formed on the suction duct 13 without obstructing the suction of the recording medium to the platen 12.

Further, the printer 1 includes the recording head 111 configured to eject ink to the recording medium, and the opening 134 is formed such that an air pressure in the suction duct 13 becomes equal to or below a predetermined pressure, in the printing region facing the recording head 111.

According to such a configuration, the opening 134 is formed such that an air pressure in the suction duct 13 becomes equal to or below a predetermined pressure, in a printing region facing the recording head 111 and hence, the suction of the recording medium to the platen 12 can be maintained.

The above-described embodiment exemplifies one aspect of the present invention, and can be arbitrarily modified and applied without departing from the gist of the present disclosure.

In the present embodiment, although the description has been made with respect to the case in which the "printing apparatus" is the printer 1, the present disclosure is not limited to such a case. It is sufficient for the "printing apparatus" to have a printing function. The "printing apparatus" may also be a multi-function apparatus having a scanning function and a facsimile function, in addition to the printing function.

In the present embodiment, although the description has been made with respect to the case in which the cover member 133 covers a portion of the motor 15, the present disclosure is not limited to such a case. It is sufficient that the cover member 133 covers at least a portion of the motor 15. For example, the cover member 133 may cover the entire side surface of the motor 15. In this case, the motor 15 can be further effectively cooled.

In the present embodiment, although the description has been made with respect to the case in which the opening 134 is formed in a circular shape, the present disclosure is not limited to such a case. It is sufficient that the opening 134 is formed in the cover member 133. For example, the opening 134 may be formed in an elongated circular shape extending in the width direction D2 of the recording medium.

In the present embodiment, although the description has been made with respect to the case in which the opening 134 is formed at one place, the present disclosure is not limited to such a case. It is sufficient that the opening 134 is formed in the cover member 133. For example, a plurality of the openings 134 may be formed so as to be aligned along the width direction D2 of the recording medium.

In the present embodiment, although the opening 134 is formed at the center position of the cover member 133 with respect to the transport direction D1 of the recording medium, the present disclosure is not limited to such a configuration. It is sufficient that the opening 134 is formed in the cover member 133. For example, the opening 134 may be formed in the cover member 133 at a position facing a bottom surface of the motor 15.

In the present embodiment, although the description has been made with respect to the case in which the outer surface of the motor 15 is formed in a circular columnar shape, the present disclosure is not limited to such a case. A fin extending in the transport direction D1 of the recording medium may be formed on the periphery of the outer surface of the motor 15.

In the present embodiment, although the description has been made with respect to the case in which the "component having a heat generating source" is the motor 15, the present disclosure is not limited to such a case. The "component having a heat generating source" may be an actuator such as a piston, or a drive transmission mechanism, for example.

What is claimed is:

1. A printing apparatus comprising:
a platen having a plurality of suction ports for sucking a printing medium;
a suction fan;
a suction duct configured to couple the plurality of suction ports and the suction fan to each other; and
a component having a heat generating source;
a cover member constituting a portion of the suction duct and covering at least a portion of the component,
a gap is formed between the cover member and the component, and
an opening is formed in the cover member,
wherein a position of the opening formed in the cover member is disposed at a center position of the cover member in a transport direction of the recording medium, the position being a position further separated from the component than the center of the cover member in a width direction of the recording medium.

2. The printing apparatus according to claim 1, wherein
the cover member is disposed at a position facing the platen.

3. The printing apparatus according to claim 1, wherein
the suction duct includes a first member supporting the platen, and a second member facing the first member, and
the cover member is formed at the second member.

4. The printing apparatus according to claim 1, comprising a recording head configured to eject ink to the recording medium, wherein the opening is formed in a printing region facing the recording head such that an air pressure in the suction duct becomes equal to or below a predetermined pressure.

* * * * *